US006831667B1

(12) United States Patent
Russin et al.

(10) Patent No.: US 6,831,667 B1
(45) Date of Patent: Dec. 14, 2004

(54) METHOD AND AN APPARATUS FOR DISPLAYING SECTIONS OF WEB PAGES IN MULTIPLE MODES

(75) Inventors: Robert Michael Russin, Austin, TX (US); Cristi Nesbitt Ullmann, Austin, TX (US); Allen Chester Wynn, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 396 days.

(21) Appl. No.: 09/662,231

(22) Filed: Sep. 14, 2000

(51) Int. Cl.[7] .............................. G09G 5/00; G06F 15/16
(52) U.S. Cl. ........................ 345/835; 345/738; 709/217
(58) Field of Search ................................. 345/738, 853, 345/810, 815, 823, 821, 825, 835, 760, 744, 838; 709/235, 203, 217; 715/501.1

(56) References Cited

U.S. PATENT DOCUMENTS

| | | | | |
|---|---|---|---|---|
| 5,802,292 A | * | 9/1998 | Mogul ......................... | 709/203 |
| 5,903,727 A | * | 5/1999 | Nielsen ....................... | 709/212 |
| 5,953,720 A | | 9/1999 | Mithal et al. ................. | 707/10 |
| 5,963,208 A | * | 10/1999 | Dolan et al. ................. | 345/760 |
| 5,983,234 A | | 11/1999 | Tietjen et al. ............... | 707/103 |
| 5,999,944 A | | 12/1999 | Lipkin ........................ | 707/104 |
| 6,009,441 A | | 12/1999 | Mathieu et al. ............. | 707/516 |
| 6,073,137 A | * | 6/2000 | Brown et al. ............ | 707/104.1 |
| 6,182,116 B1 | * | 1/2001 | Namma et al. ............. | 709/204 |
| 6,199,098 B1 | * | 3/2001 | Jones et al. .................. | 709/203 |
| 6,405,221 B1 | * | 6/2002 | Levine et al. ............ | 715/501.1 |
| 6,515,681 B1 | * | 2/2003 | Knight ........................ | 361/709 |
| 6,559,862 B1 | * | 5/2003 | Nakazawa ................... | 345/738 |

OTHER PUBLICATIONS

Wittenburg et al., "Visual Focusing and Transition Techniques in a Treeviewer for Web Information Access", Visual Languages, Proceedings. IEEE Symposium on Isle of Capri, Italy, IEEE Comput. Soc, 23–26 Sep. 1997, pp. 20–27.

Borysowich, "Lotus Notes and the World Wide Web—A New Partnership", Internet Article, May 13, 1996, http://www.keysolutions.com/NotesFAQ/craig.html, pp. 1–5.

* cited by examiner

*Primary Examiner*—John Cabeca
*Assistant Examiner*—Blaine Bason
(74) *Attorney, Agent, or Firm*—Duke W. Yee; David A. Mims, Jr.; Wayne P. Bailey

(57) ABSTRACT

A method and an apparatus is provided for managing a set of expansion icons and associated information so that the user can selectively open and close expansion icons with a minimum of network bandwidth. In a preferred embodiment, an expansion flag and the information location is maintained for each expansion icon and information is downloaded on an "on demand" basis. Once an item has been opened and the information downloaded, the information location is changed to a local memory address. The associated information may be in a variety of multimedia formats, including text, URLs, audio, video, or picture information. It is possible to open several expansion icons at the same time while keeping other icons closed. When an expansion icon is closed, the expansion flag is set to false and information location is reset to a server location. In an alternative embodiment, all of the information associated with the expansion icons is downloaded at the time the web page is accessed. Opening and closing icons after this initial download is based on information stored in local memory. In either embodiment, even time an expansion icon is changed, the system scans through all expansion icons and for those with an expansion flag set to true, uses the associated information location to display the additional information.

26 Claims, 8 Drawing Sheets

```
<TR VALIGN=top>
<TD COLSPAN=5 NOWRAP>
<A HREF="/pspfixpk.nsf/FixPaks%2Fall+By+Year+2000?OpenView&Start=1&Count=300&
        Expand=1#1" TARGET="_self">
<IMG SRC="/icons/expand.gif" BORDER=0 ALT="+" HEIGHT=16 WIDTH=16>
</A>
<B>BookManager Build for Windows NT V210</B>
</TD>
</TR>
```

*FIG. 6A*

| TAG DATA STRUCTURE |
|---|
| Expanded: boolean |
| Expanded Data: pointer<br>  if unexpanded, pointer is to structure on server<br>  if expanded, pointer is to structure in memory |

*FIG. 6B*

METHOD AND AN APPARATUS FOR DISPLAYING SECTIONS OF WEB PAGES IN MULTIPLE MODES

BACKGROUND OF THE INVENTION

1. Technical Field

The present invention relates generally to an improved display of web pages and in particular to a method and an apparatus for expanding sections of the display based on user selections. Still more particularly, the present invention provides a method and an apparatus for allowing the user to expand one or more sections of a document while minimizing network traffic to accomplish this task.

2. Description of the Related Art

The Internet has provided a wealth of information for uses to access and explore. The Internet also provides mechanisms for downloading information once the web page containing the desired information is found. It is very important that the exploration mechanism for finding the desired information be easy to operate from a user's perspective and efficient from a technical perspective to avoid generation of unnecessary download of information that congests the available bandwidth.

Web pages provide several mechanisms to display additional information based on user requests. One mechanism is to hyperlink to a new web page which is then downloaded. This mechanism is easy to implement but it does not allow expansion of material within the context of an existing screen image; it simply allows replacement.

Another mechanism is an expansion icon, which is a graphical icon that appears to the left of a title in a list of titles. In the closed position (▶), only the title appears and none of the subtitles. In the open position (▼), the subtitles will appear under the title. The expansion icon toggles between opened and closed by clicking on it with a mouse.

Although this mechanism has the appearance of only modifying a section of the screen, in actual implementation the entire screen image is reloaded with the selected section either expanded or contracted based on the action performed. Another disadvantage of this mechanism is that only one section can be expanded at a time. A final disadvantage is that the mode of display is limited; in many applications only text and hyperlinks are displayed.

Therefore, it would be advantageous to have a method and an apparatus that can expand one or more sections of a web page in multiple display modes and with a minimum of network traffic.

SUMMARY OF THE INVENTION

A method and an apparatus is provided for managing a set of expansion icons and associated information so that the user can selectively open and close expansion icons with a minimum of network bandwidth. In a preferred embodiment, an expansion flag and the information location is maintained for each expansion icon and information is downloaded on an "on demand" basis. Once an item has been opened and the information downloaded, the information location is changed to a local memory address. The associated information may be in a variety of multimedia formats, including text, URLs, audio, video, or picture information. It is possible to open several expansion icons at the same time while keeping other icons closed. When an expansion icon is closed, the expansion flag is set to false and information location is reset to a server location.

In an alternative embodiment, all of the information associated with the expansion icons is downloaded at the time the web page is accessed. Opening and closing icons after this initial download is based on information stored in local memory.

In either embodiment, every time an expansion icon is changed, the system scans through all expansion icons and for those with an expansion flag set to true, uses the associated information location to display the additional information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A shows the XML code associated with an expansion icon in the prior art;

FIG. 6B shows the tag code structure in accordance with a preferred embodiment of the present invention;

DETAILED DESCRIPTION OF THE PREFERRED EMBODIMENT

Figure 1:
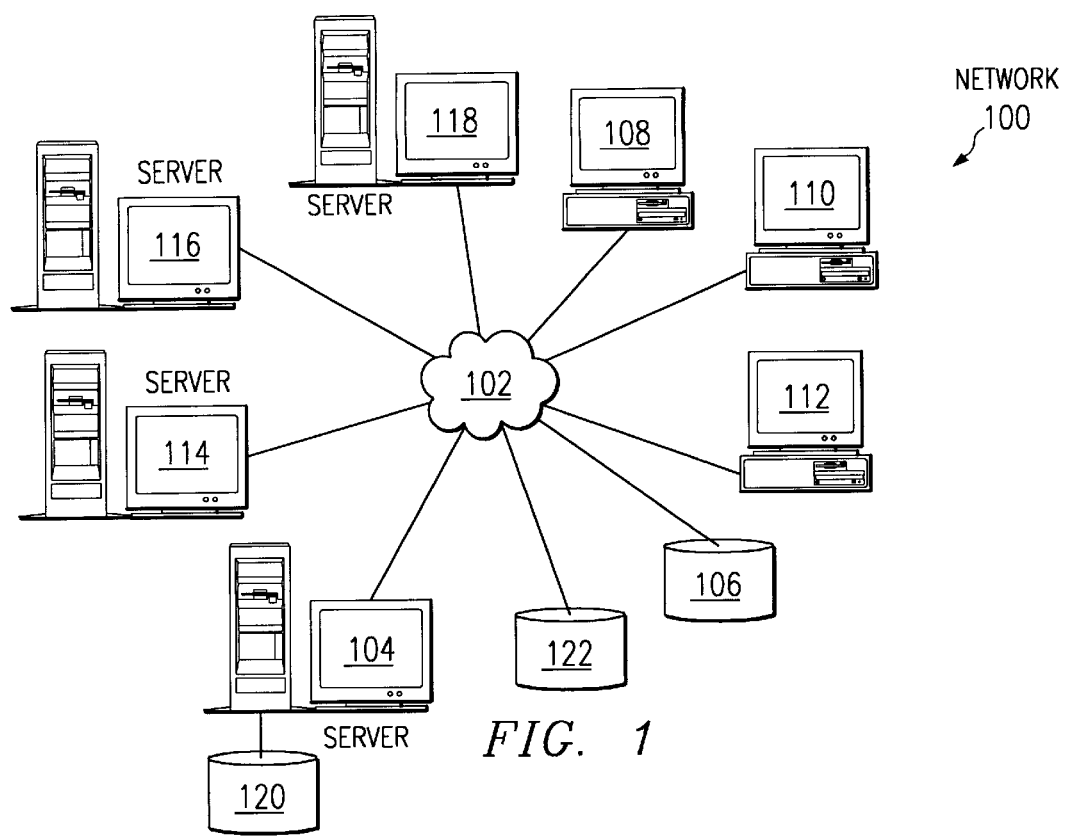
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118.

In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

The present invention is implemented in a distributed data processing environment where a user at a client machine, such as client 108, requests the display of a web page from a server, such as server 104. The web page can contain a variety of content, including multimedia, and the user can selectively display various portions of the web page. FIG. 1 is intended as an example and not as an architectural limitation for the processes of the present invention.

Figure 2:
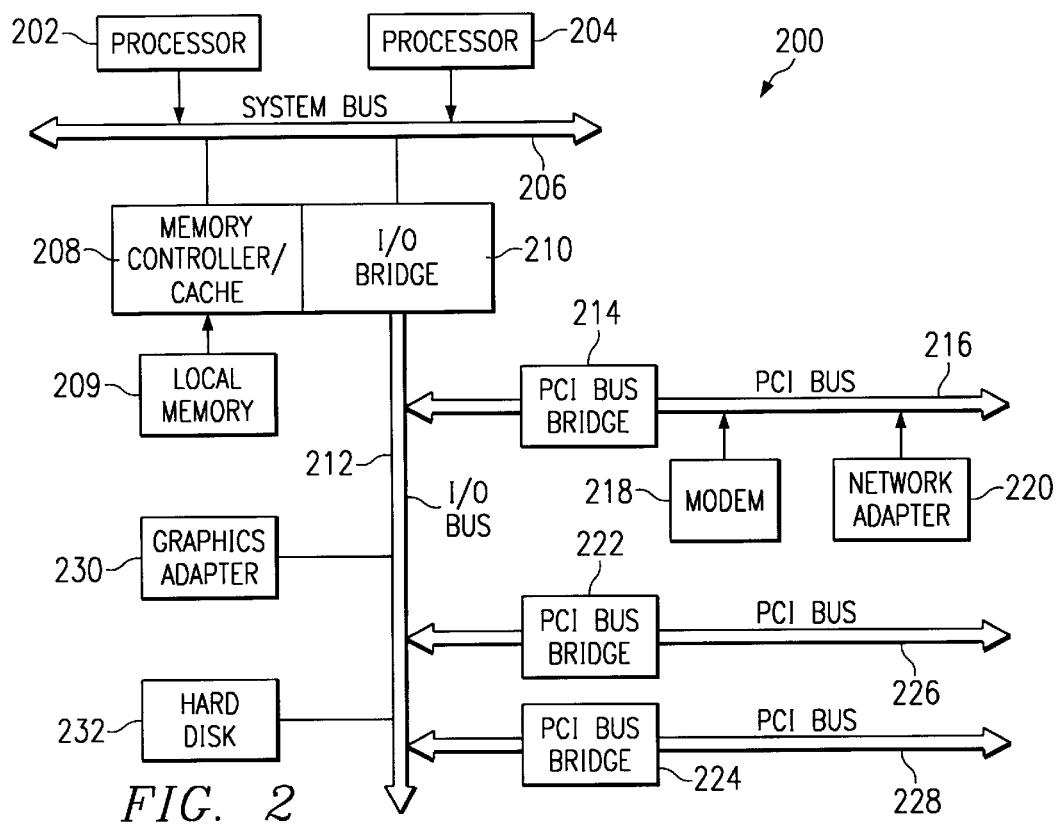
FIG. 2 is a block diagram of a data processing system that may be implemented as a server in which the present invention may be implemented.

Referring to FIG. 2, a block diagram of a data processing system which may be implemented as a server or client, such as server 104 or client 108 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system. The server machine is the source of the Web pages sent to the client using the present invention.

Figure 3:
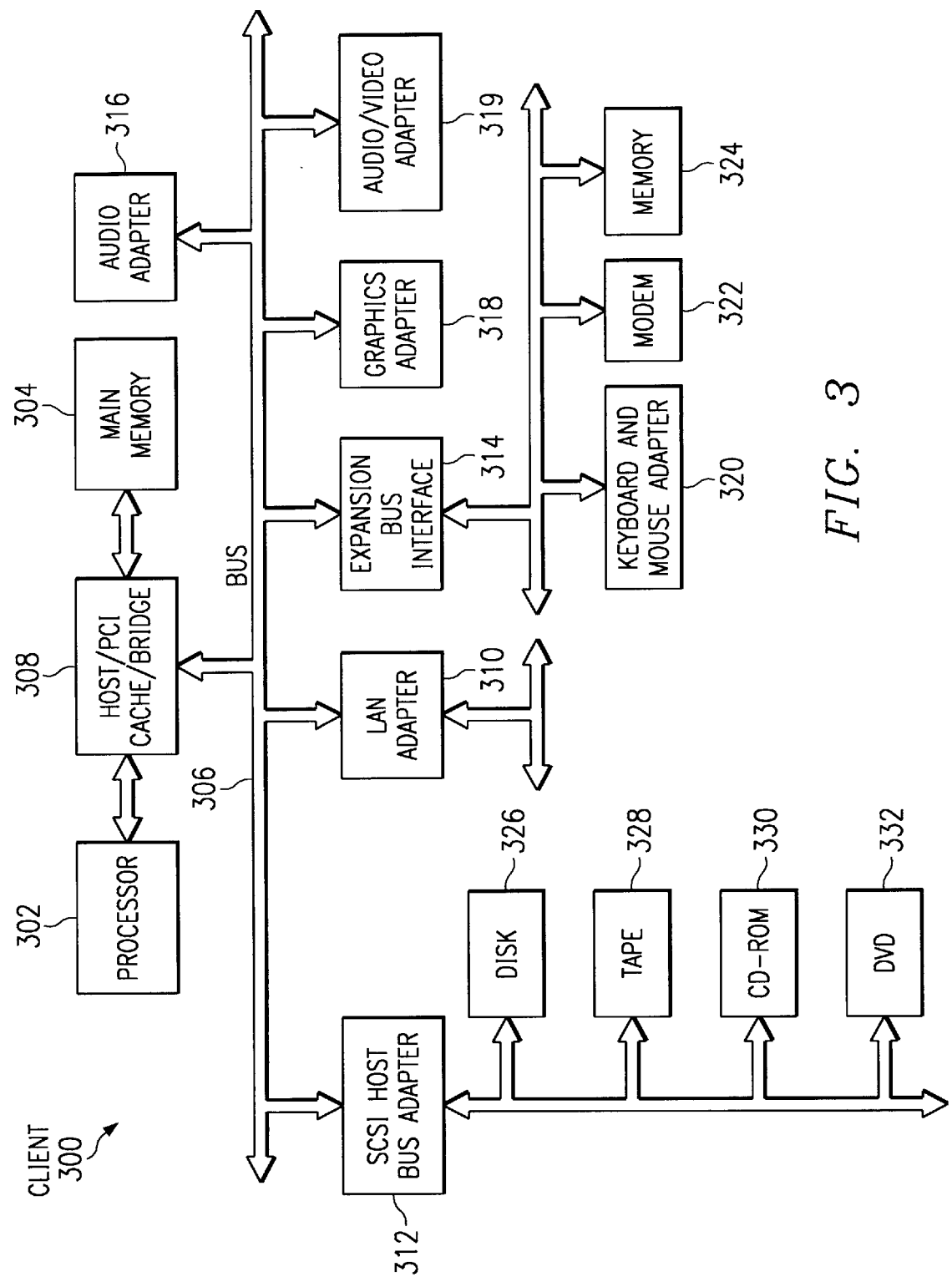
FIG. 3 is a block diagram of a data processing system that may be implemented as a client in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as UNIX or a Microsoft Windows operating system, but not limited to any one operating system.

The client machine displays the Web pages sent from the server and is the location where the user controls the display of the web pages in this invention.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
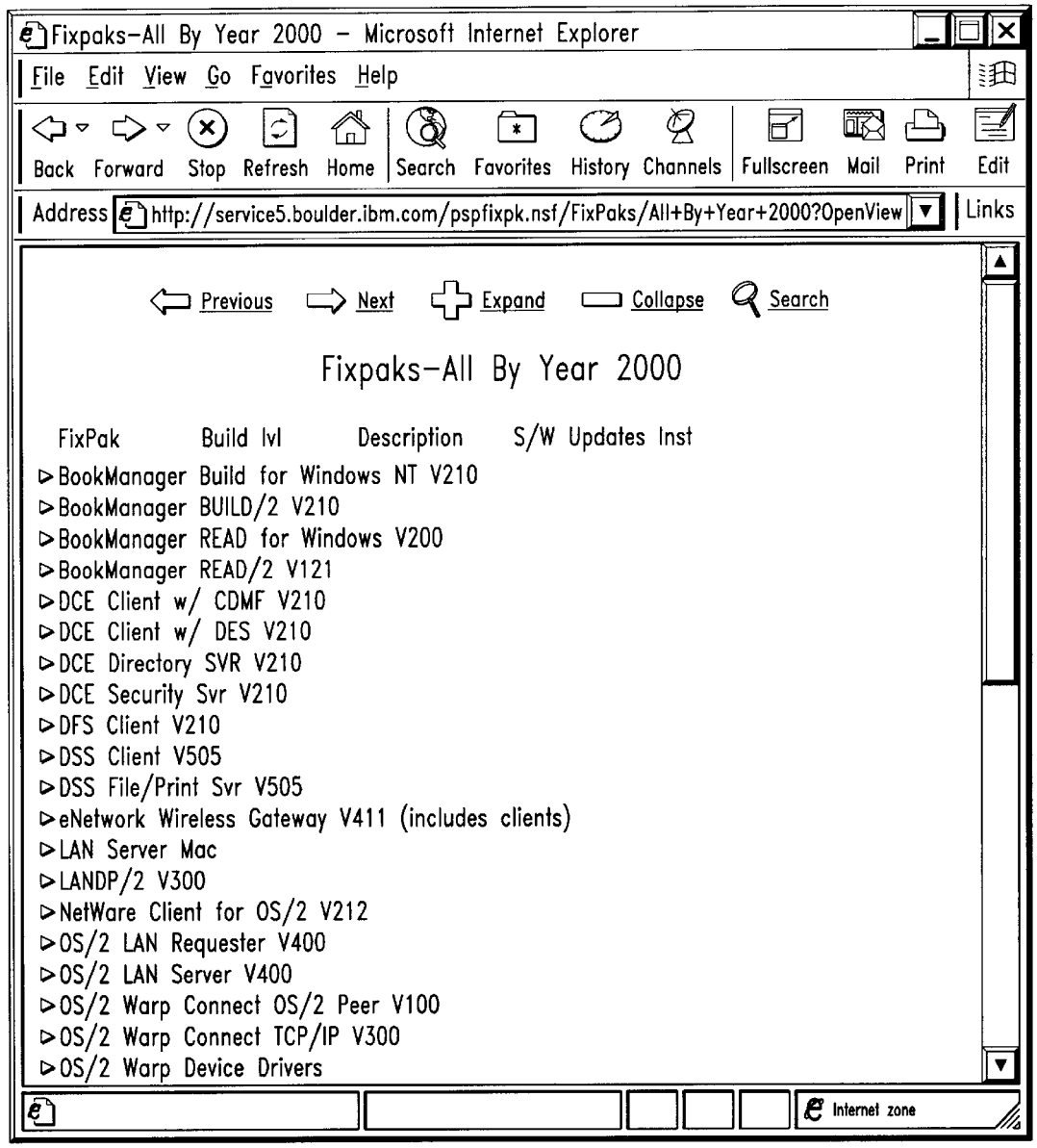
FIG. 4 is a screen image showing a list of expansion icons in a contracted state in the prior art.

FIG. 4 shows a screen image containing a list of expansion icons in a contracted state. The expansion icons appear to the left of each title in a list of titles. In the closed position (▶) only the title appears and none of the associated information is visible. The expansion icon toggles between opened and closed by clicking on it with a mouse.

Figure 5A:
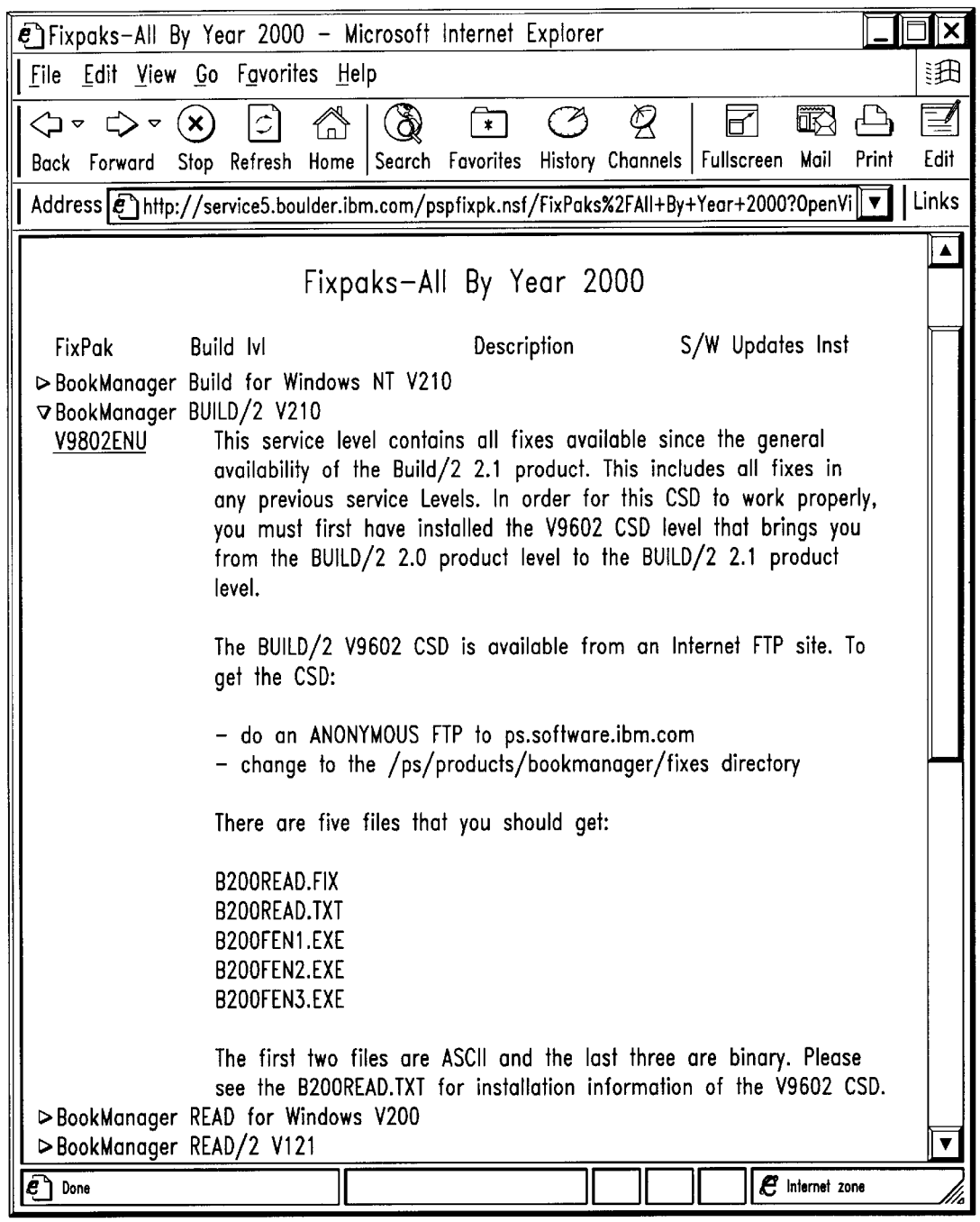
FIG. 5A is a screen image showing a list of expansion icons with the second item in an expanded state in the prior art.

FIG. 5A shows the same screen image as FIG. 4 except that the second item is in an expanded state. When the expansion icon is in the open position (▼), the associated information with the icon is displayed. In this case, the second item in the list, "BookManager BUILD/2 V210", has been expanded to reveal a hyperlink, "V9802ENU", and an explanation of what is contained at the hyperlink, if selected. The unexpanded items on the list are still present, but due to the displacement caused by the expansion of the second item, most have to be accessed by using the scroll bar on the right side of the screen.

Figure 5B:
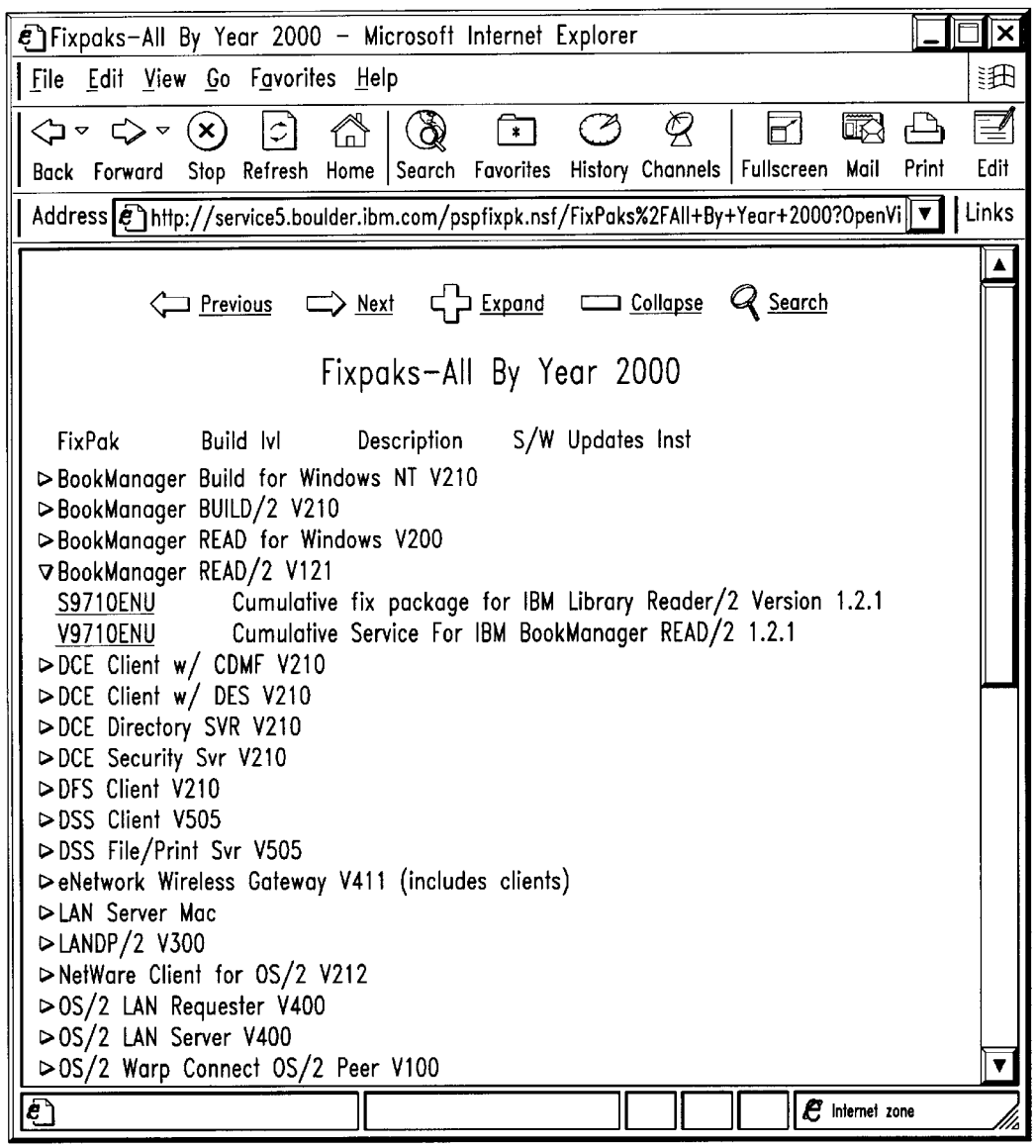
FIG. 5B is a screen image showing the result of opening the fourth expansion icon from the screen image shown in FIG. 5A in the prior art.

FIG. 5B shows a screen image that results from opening the fourth expansion icon from the screen image shown in FIG. 5A. This automatically causes the second expansion icon to be closed because only one icon can be expanded at one time. This particular web page allows all icons to be expanded simultaneously by clicking on the "+ Expand" icon at the top center, but, unlike the present invention, it is impossible to expand more than one section and leave other sections unexpanded.

FIGS. 4 and 5 illustrate the current use of expansion icons. The expanded information is limited to hyperlinks and textual information. Furthermore, only one item can be in an open state at one time. When the state of an expansion icon is changed, the entire web page is downloaded. This is wasteful of network bandwidth although only one portion of the web page is changed. It is these limitations that motivate the present invention.

FIG. 6A shows the XML code associated with the second expansion icon in the list of items shown in FIG. 4. For clarity, the tag starting "<A HREF=..>" has been split into two lines, but as one of ordinary skill in the art will appreciate, this tag will be on one line in the actual XML code.

FIG. 6B indicates a modified tag code structure in accordance with a preferred embodiment of the present invention. Two items are shown, a Boolean-valued tag called "Expanded" and a pointer to the associated data. If the graphical icon is currently closed, the data pointer will point to the associated data that is stored on the server. However, if the graphical icon is expanded, this data on the server is downloaded to the memory of the client machine and the pointer will be set to the memory address of this data on the client machine.

FIG. 6B indicates the structure of a modified tag associated with a single graphical icon, but all other graphical icons will be modified in the same way. This means that icons can be selectively expanded with the associated information store in local memory on the client machine. This associated information may be in a variety of data formats, including multimedia formats such as audio clips (e.g., WAVE clips), picture images (e.g., JPEG images), or video clips (e.g., MPEG clips). Providing the client machine contains an appropriate player for the data format, a wide variety of formats can be accommodated.

Two implementations of the present invention are possible. In the first implementation information associated with expansion icons is downloaded on an "on demand" basis and stored locally. It is not necessary to download the entire page when an icon is opened. Using a second approach, the entire page, including all expansion information, is downloaded to the local machine. All expansion sections are initially displayed in a closed position. When sections are expanded, they can be fetched from local memory. These two implementations are best understood by examining detailed flowcharts describing their operations.

Figure 7:
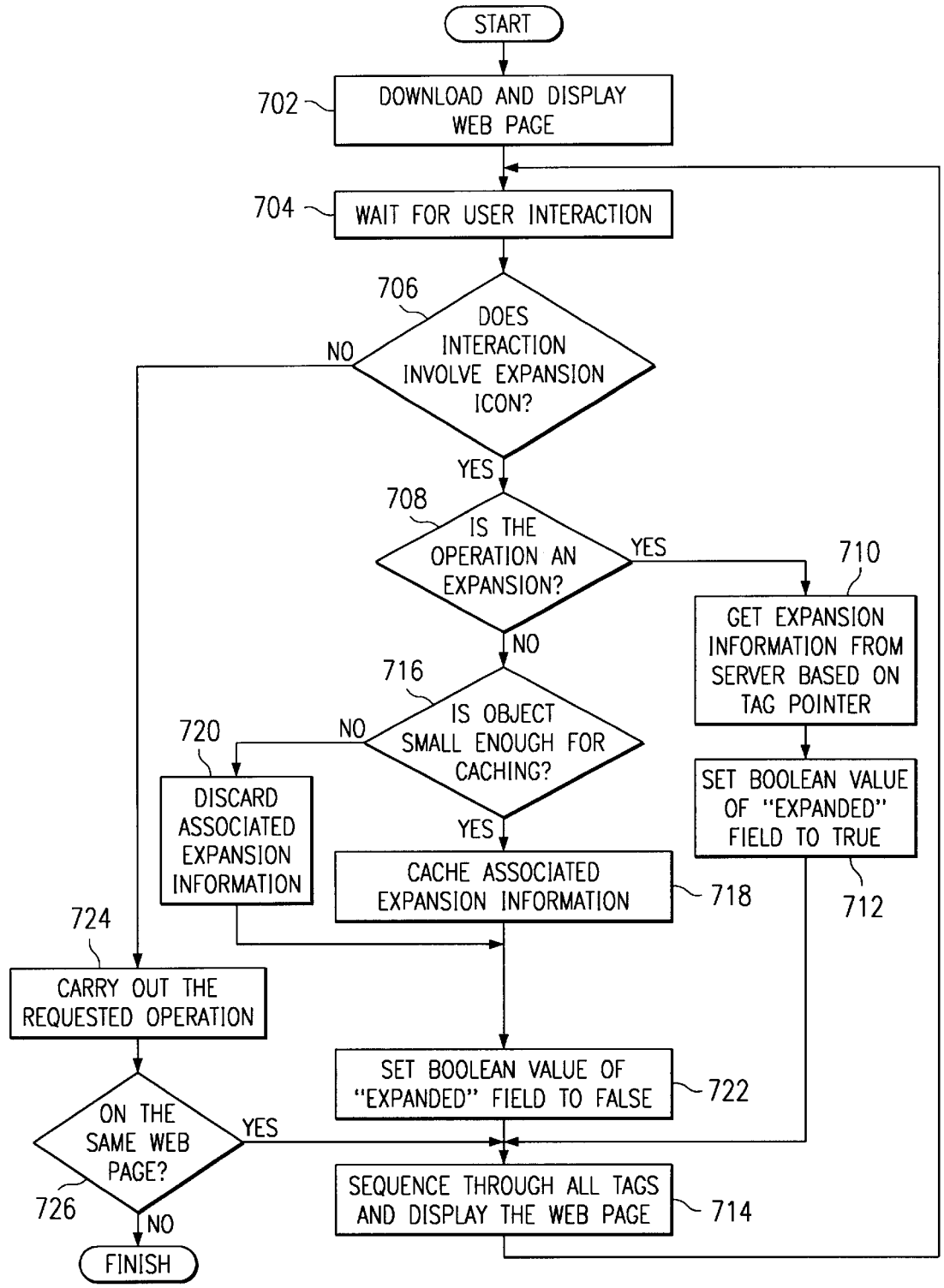
FIG. 7 is a flowchart showing the selective transfer of expansion information in accordance with a preferred embodiment of the present invention.

FIG. 7 shows a flowchart for the "on demand" transfer of expansion information for a particular web page. The web page is initially downloaded and displayed (step 702) with the expansion icons in the closed position. The system then waits for some user interaction (step 704), which may involve manipulating an expansion icon or may involve some other action. If the action involves the manipulation of an expansion icon (step 706: yes), then the position of the mouse relative to the current screen image identifies the icon being toggled.

If the "expanded" Boolean flag is currently false, then the operation is an expansion (step 708: yes). The information for the expanded section is located on the server, as indicated by the data pointer, so this information is downloaded (step 710). This results in the data pointer being changed to a local memory address and the value of the Boolean flag being changed to true (step 712). The system then sequences through all tags of the page causing it to be re-displayed (step 714). For the user, it appears that the selected section has been expanded.

It is important to note that the expansion operation is accomplished by only downloading the information associated with the selected expansion icon and not by downloading the entire web page. This is an efficient use of network bandwidth. Since the Boolean flag is true and the data pointer is changed to the memory location where the information is stored, the new information appears when the page is re-displayed (step 714). Since all displayed information is in local memory, the display operation is quicker than the download of the entire page from the server.

If the "expanded" Boolean flag is currently true (step 708: no) indicating the expansion information is already being stored locally, then the operation is a contraction. There are two alternatives available at this time: retain the expansion information in local memory in the event the section is re-expanded or discard the expansion information. Size will be an important factor in making this decision. If the size of the object is small (step 716: yes), such as some text and/or hyperlinks, then the expansion information is retained in local memory (step 718). However, if the object is large (step 716: no), such as a video clip, then the local copy of the expansion is discarded (step 720) and the data pointer value is changed back to download from the server. Regardless of whether the information is cached or not, the "expanded" Boolean flag is set to false (step 722) and the web page is re-displayed (step 714).

As one of ordinary skill in the art will appreciate, a variety of strategies are possible regarding the caching of expansion information that has been contracted. A strategy to always retain the information or to always discard the information is easy to implement. A more sophisticated strategy would be, as a default, to cache the contracted information. However, if some future expansion requires more memory than currently available, a "garbage collector" would discard some of the cached information to recover memory space and reset the data pointers for those sections discarded back to the server.

Returning to FIG. 7, if the user interaction does not involve toggling of an expansion icon (step 706: no), then the requested operation is performed (step 724). If the operation exits the current web page (step 726: no), such as following a hyperlink, then manipulation of the current web page is finished. If the operation stays on the same web page (step 726: yes), such as moving the scroll bar, then the page is re-displayed (step 714) after completing the operation.

Figure 8:
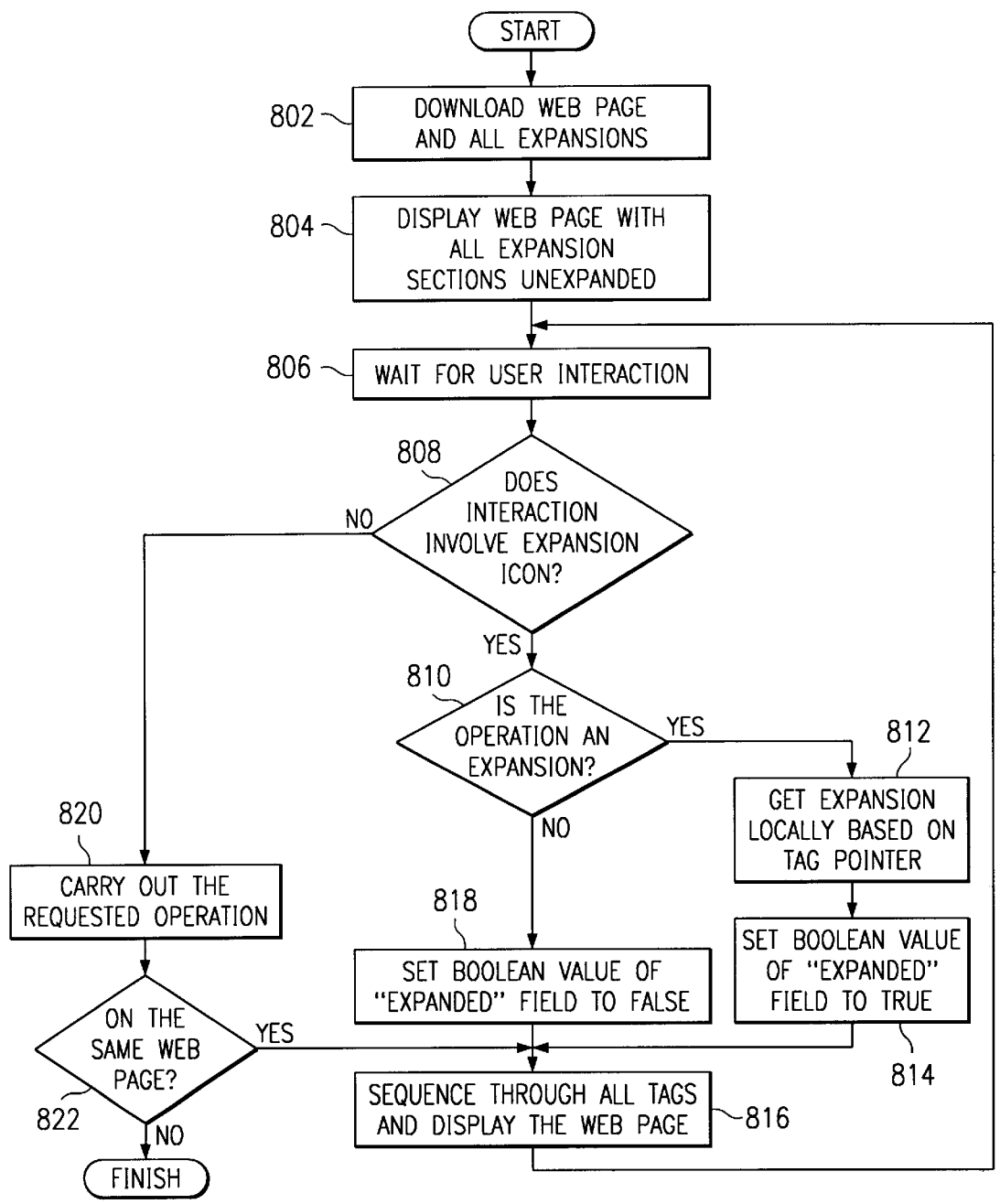
FIG. 8 is a flowchart showing the download and processing of all expansion information in accordance with a preferred embodiment of the present invention.

FIG. 8 shows a flowchart for the download and processing of all expansion information at the time the web page is accessed. Initially the web page, including all expansion information, is downloaded from the server (step 802). All of the "expanded" Boolean flags are initialized to false resulting in all expansion sections being closed (step 804). The data pointers are changed from the server location to the local memory addresses. The system waits for some interaction from the user (step 806). If that interaction involves toggling an expansion icon (step 808: yes), then, based on the current state of the selected icon, the corresponding section is either opened or closed. If the icon is opened (step 810: yes), then the expansion information is located in memory (step 812) and the "expanded" Boolean flag is set to true (step 814). The web page is re-displayed (step 816) with the newly opened section displayed. If an expansion icon is already open (step 810: no), then the "expanded" Boolean flag is set to false (step 818) and the web page is re-displayed (step 816) with the selected section closed.

If the user interaction does not involve toggling of an expansion icon (step 808: no), then the requested operation is performed (step 820). If the operation stays on the same web page (step 822: yes), then the page is re-displayed (step 816). If the operation exits the current web page (step 822: no), then operation on the current web page is finished.

The description of the present invention has been presented for purposes of illustration and description but is not intended to be exhaustive or limited to the invention in the form disclosed. Many modifications and variations will be apparent to those of ordinary skill in the art. For example, several strategies combining the "on demand" approach of FIG. 7 and the "total download" of FIG. 8 are possible. One variation would be to set a size threshold where, at the time the web page is accessed, all information associated with an expansion icon smaller than the prescribed size is downloaded with the web page and information larger than that size remains at the web site. The embodiment described was chosen in order to best explain the principles of the invention and the practical application, and to enable others of ordinary skill in the art to understand the invention for various embodiments with various modifications as are suited to the particular use contemplated.

What is claimed:

1. A method in a distributed data processing system for managing a set of expansion icons and associated information, the method comprising the steps of:

maintaining an expansion flag and an information location for each expansion icon from the set of expansion icons;

displaying the information associated with each expansion icon from the set of expansion icons based on the expansion flag and, if the expansion flag is true, the information referenced by the information location; and opening a closed expansion icon from the set of expansion icons, wherein the opening further comprises the steps of:

downloading information from a server address stored in an information location associated with the closed expansion icon;

storing the downloaded information at a local memory address in the distributed data processing system and setting the information location to the local memory address; and setting the expansion flag associated with the closed expansion icon to a true state.

2. The method of claim 1, wherein the information referenced by the information location may be one of textual information, a uniform resource link (URL), an audio file, a picture file, and a video file.

3. The method of claim 1, further comprising closing the expansion icon, wherein the expansion flag associated with the expansion icon is set to false, the information location is set to a server address, and the local memory for storing the information associated with the expansion icon is released.

4. The method of claim 1, further comprising closing the expansion icon, wherein the expansion flag associated with the expansion icon is set to false, the information location is retained as a local memory address, and the local memory for storing the information associated with the expansion icon is maintained.

5. The method of claim 1, wherein the information associated with each expansion icon and the information referenced by the information location are displayed in the same view window.

6. The method of claim 5, wherein if the expansion flag is true for a plurality of the set of expansion icons, simultaneously displaying the information referenced by the information location for each associated expansion icon having a true expansion flag.

7. The method of claim 1, wherein every time an expansion icon is changed, scanning all of the expansion icons and for those having a true expansion flag, displaying the information referenced by their associated information location.

8. A method in a distributed data processing system for managing a set of expansion icons and associated information, the method comprising the step of:

downloading the set of expansion icons and associated information;

maintaining an expansion flag and an information location for each expansion icon from the set of expansion icons; and displaying the information associated with each expansion icon from the set of expansion icons based on the expansion flag and, if the expansion flag is true, the information referenced by the information location, wherein downloading the set of expansion icons and associate information further comprises, for each icon from the set of expansion icons, the steps of:

downloading information from a server address stored in an information location associated with the expansion icon;

storing the downloaded information at a local memory address in the distributed data processing system and setting the information location to the local memory address; and setting the expansion flag associated with the expansion icon to a false state.

9. The method of claim 8, wherein the information referenced by the information location may be one of textual information, a uniform resource link (URL), an audio file, a picture file, and a video file.

10. The method of claim 8, further comprising closing an expansion icon, wherein the expansion flag associated with the expansion icon is set to false, the information location to local memory is retained, and local memory for storing the information associated with the expansion icon is maintained.

11. The method of claim 8, wherein the information associated with each expansion icon and the information referenced by the information location are displayed in the same view window.

12. The method of claim 11, wherein if the expansion flag is true for a plurality of the set of expansion icons, simultaneously displaying the information referenced by the information location for each associated expansion icon having a true expansion flag.

13. An apparatus in a distributed data processing system for managing a set of expansion icons and associated information, the apparatus comprising:
   maintaining means for maintaining an expansion flag and an information location for each expansion icon from the set of expansion icons;
   displaying means for displaying the information associated with each expansion icon from the set of expansion icons based on the expansion flag and, if the expansion flag is true, the information referenced by the information location; and
   opening means for opening a closed expansion icon from the set of expansion icons, wherein the opening further comprises:
      downloading inform nation from a server address stored in an information location associated with the closed expansion icon;
      storing the downloaded information at a local memory address in the distributed data processing system and setting the information location to the local memory address; and
      setting the expansion flag associated with the closed expansion icon to a true state.

14. The apparatus of claim 13, wherein the information referenced by the information location may be one of textual information, a uniform resource link (URL), an audio file, a picture file, and a video file.

15. The apparatus of claim 13, further comprising a closing means for closing the expansion icon, wherein the expansion flag associated with the expansion icon is set to false, the information location is set to a server address, and the local memory for storing the information associated with the expansion icon is released.

16. The apparatus of claim 13, further comprising a closing means for closing the expansion icon, wherein the expansion flag associated with the expansion icon is set to false, the information location is retained as a local memory address, and the local memory for storing the information associated with the expansion icon is maintained.

17. An apparatus in a distributed data processing system for managing a set of expansion icons and associated information, the apparatus comprising:
   downloading means for downloading the set of expansion icons and associated information;
   maintaining means for maintaining an expansion flag and an information location for each expansion icon from the set of expansion icons; and
   displaying means for displaying the information associated with each expansion icon from the set of expansion icons based on the expansion flag and, if the expansion flag is true, the information referenced by the information location, wherein downloading the set of expansion icons and associate information further comprises, for each icon from the set of expansion icons;
   downloading information from a server address stored in an information location associated with the expansion icon;
   storing the downloaded information at a local memory address in the distributed data processing system and setting the information location to the local memory address; and
   setting the expansion flag associated with die expansion icon to a false state.

18. The apparatus of claim 17, wherein the information referenced by the information location mu ay be one of textual information, a uniform resource link (URL), an audio file, a picture file, and a video file.

19. The apparatus of claim 17, further comprising a closing means for closing an expansion icon, wherein the expansion flag associated with the expansion icon is set to false, the information location to local memory is retained, and local memory for storing the information associated with the expansion icon is maintained.

20. A computer program product in a distributed data processing system for Managing a set of expansion icons and associated information, the computer program product comprising:
   instructions for maintaining an expansion flag and an information location for each expansion icon from the set of expansion icons;
   instructions for displaying the information associated with each expansion icon from the set of expansion icons based on the expansion flag and, if the expansion flag is true, the information referenced by the information location; and
   instructions for opening a closed expansion icon from the set of expansion icons, wherein the opening further comprises the steps of:
      instructions for downloading information from a server address stored in an information location associated with the closed expansion icon;
      instructions for storing the downloaded information at a local memory address in the distributed data processing system and setting the information location to the local memory address; and
      instructions for setting the expansion flag associated with the closed expansion icon to a true state.

21. The computer program product of claim 20, wherein the information referenced by the information location maybe one of textual information, a uniform resource link (URL), an audio file, a picture file, and a video file.

22. The computer program product of claim 20, further comprising instructions for closing the expansion icon, wherein the expansion flag associated with the expansion icon is set to false, the information location is set to a server address, and the local memory for storing the information associated with the expansion icon is released.

23. The computer program product of claim 20, further comprising instructions for closing the expansion icon, wherein the expansion flag associated with the expansion icon is set to false, the information location is retained as a local memory address, and the local memory for storing the information associated with the expansion icon is maintained.

24. A computer program product in a distributed data processing system for managing a set of next expansion icons and associated information, the computer program product comprising:
   instructions for downloading the set of expansion icons and associated information;
   instructions for maintaining an expansion flat and information location for each expansion icon from the set of expansion icons; and instructions for displaying the information associated with each expansion icon from the set of expansion icons based on the expansion flag and, if the expansion flag is true, the information referenced by the information location, wherein downloading the set of expansion icons and associate information further comprises, for each icon from the set of expansion icons, the steps of:

downloading information from a server address stored in an information location associated with the expansion icon;

storing the downloaded information at a local memory address in the distributed data processing system and setting the information location to the local memory address; and setting the expansion flag associated with the expansion icon to a false state.

25. The computer program product of claim 24, wherein the information referenced by the information location may be one of textual information, a uniform resource link (URL), an audio file, a picture file, and a video file.

26. The computer program product of claim 24, further comprising instructions for closing an expansion icon, wherein the expansion flag associated with the expansion icon is set to false, the information location to local memory is retained, and local memory for storing the information associated with the expansion icon is maintained.

* * * * *

UNITED STATES PATENT AND TRADEMARK OFFICE
CERTIFICATE OF CORRECTION

PATENT NO.    : 6,831,667 B1  
DATED         : December 14, 2004  
INVENTOR(S)   : Russin et al.

Page 1 of 1

It is certified that error appears in the above-identified patent and that said Letters Patent is hereby corrected as shown below:

<u>Column 5,</u>
Line 38, after "shown in" delete the return.

<u>Column 8,</u>
Line 37, delete "step" and insert -- steps --.

<u>Column 9,</u>
Line 24, delete "inform nation" and insert -- information --.

<u>Column 10,</u>
Line 5, delete "die" and insert -- the --.
Line 8, delete "mu ay" and insert -- may --.
Line 18, delete "Managing" and insert -- managing --.
Line 43, delete "maybe" and insert -- may be --.
Line 59, delete "next".
Line 64, delete "flat and" and insert -- flag and an --.

Signed and Sealed this

Eighteenth Day of April, 2006

JON W. DUDAS  
*Director of the United States Patent and Trademark Office*